May 30, 1933.  R. P. HUMPHREY  1,911,622
CORN POPPING KETTLE
Filed April 11, 1932
*Fig. 1.*
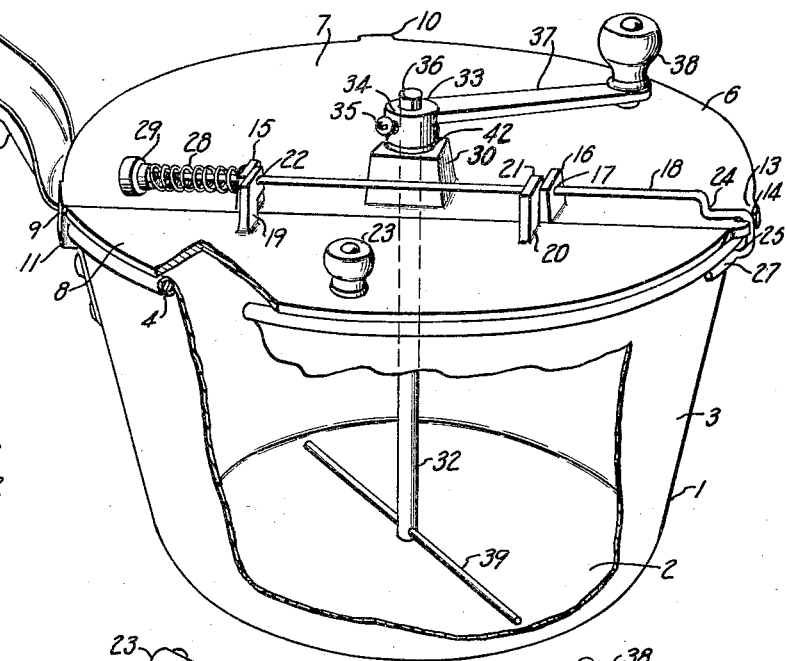
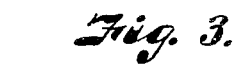
*Fig. 3.*
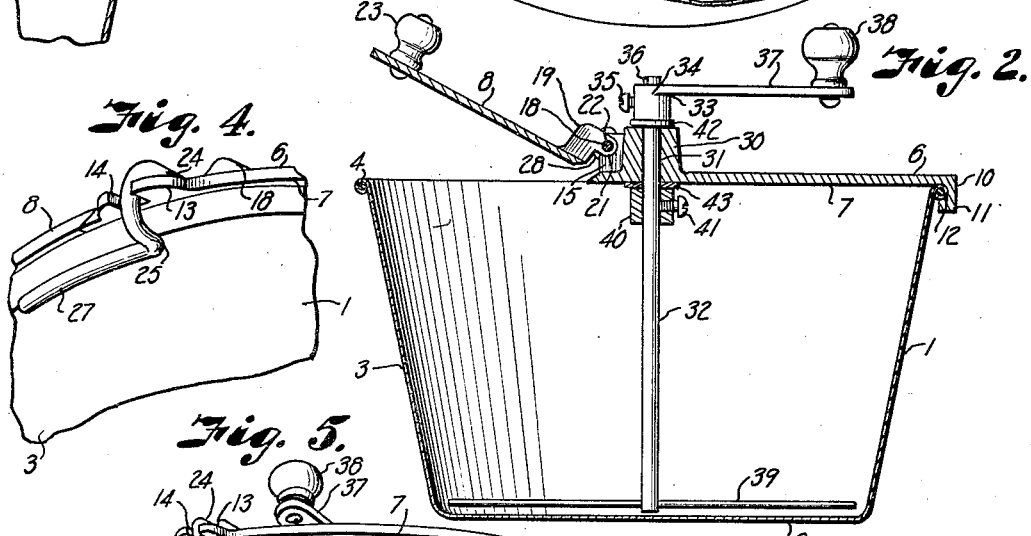
*Fig. 4.*   *Fig. 2.*
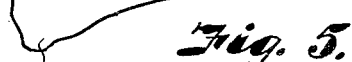
*Fig. 5.*
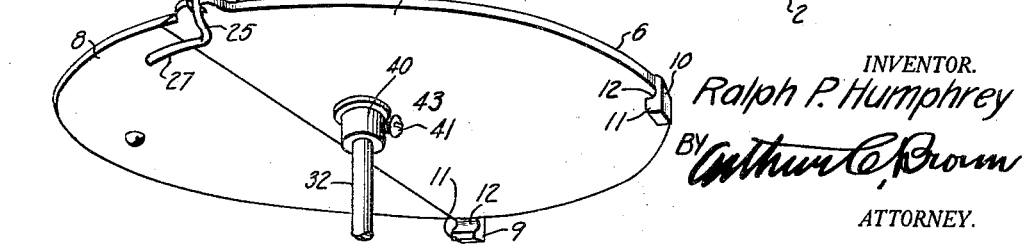
INVENTOR.
Ralph P. Humphrey
BY Arthur C. Brown
ATTORNEY.

Patented May 30, 1933

1,911,622

UNITED STATES PATENT OFFICE

RALPH P. HUMPHREY, OF KANSAS CITY, MISSOURI

CORN POPPING KETTLE

Application filed April 11, 1932. Serial No. 604,536.

This invention relates to kettles and more particularly to one for popping corn, and has for its principal object to provide a kettle structure employing a detachable corn popping apparatus whereby the kettle portion of the device may be used for any household purpose independent of the popping attachment.

Other important objects of the invention are to provide a device for cooking any of the foods that require stirring, to provide a popping attachment that is quickly applied and easily detached from the kettle without defacing or marring the kettle in any manner, and without adding attachment devices which will be in the way when the kettle portion of the device is used individually.

It is also an object of the invention to provide a lid structure which is retained securely in position during the stirring operation and in which the agitating device may be operated in either direction.

Further objects of the invention are to provide a lid construction that prevents hot grease or heat from annoying or burning the operator, and to provide a hinged portion that opens freely when the kettle is inverted to empty the contents.

Another object of the invention is to provide a kettle construction which pops both greased and sugared popcorn.

In accomplishing these and other objects of the invention, I have provided improved details of structure, the preferred form of which is illustrated in the accompanying drawing, wherein:—

Fig. 1 is a perspective view of a kettle equipped with a pop corn attachment constructed in accordance with my invention, a part of the kettle wall being broken away to better illustrate the corn agitating mechanism.

Fig. 2 is a vertical cross-section through the kettle illustrating the hinged portion of the lid in open position.

Fig. 3 is an enlarged detail perspective view through the upper rim of the kettle and adjacent portion of the lid illustrating one of the ears which cooperates with the latch mechanism in retaining the lid.

Fig. 4 is an enlarged detail perspective view of the latch for securing the lid to the kettle rim.

Fig. 5 is a detail perspective view of the under portion of the lid, particularly illustrating the attachment ears and latch member.

Referring more in detail to the drawing:—

1 designates a kettle having a substantially flat bottom 2 and an upwardly and outwardly diverging side wall 3 terminating in an annular beaded flange or rim 4. The side wall 3 is provided with the usual handle 5 by which the kettle may be lifted or held in position while the agitating mechanism is being operated, as later described.

The kettle thus far described, except for the inclined wall 3, is of ordinary construction and may be used for any household purpose independent of the popping attachment now described, and which constitutes the principal feature of the present invention.

The popping attachment includes a flat disk-shaped lid 6 having slightly larger diameter than the upper diameter of the wall, in order that it may be supported by, and slightly overlap, the rim 4 to close the open top of the kettle. The lid comprises two sections joining on a chord extending across the lid at a point spaced from the center thereof to provide a fixed cover section 7 and a hinge section 8, respectively.

The fixed section 7 is provided with a depending ear 9 formed on the outer edge thereof adjacent the juncture of the sections and an ear 10 spaced 90° therefrom and at a point substantially opposite and midway of the chord on which the sections join.

The ears 9 and 10 each include a lug 11 having an inwardly facing arcuate seat portion 12 forming a hook adapted to engage under and over the face of the rim 4, as best illustrated in Fig. 3. Also formed on the fixed portion of the disk at the side directly opposite to the ear 9 is an extending bifurcated portion 13 to provide a notch 14 extending inwardly and parallel to the juncture of the sections for guiding the latch member later described.

Extending from the upper face of the fixed section 7 at points adjacent the juncture thereof are tongues 15 and 16 having aligning openings 17 through which a rod 18 is passed to hinge the section 8. The section 8 is provided with complementary upwardly extending tongues 19 and 20 located thereon so that the outer faces of the tongues 19 and 20 overlap the inner faces of the tongues 15 and 16, as illustrated in Fig. 1.

The tongues 19 and 20 are provided with lateral extensions 21 having openings 22 aligning with the openings 17 in the complementary tongues to accommodate the hinge rod 18 by which the section 8 is hinged. The tongues 19 and 20, being located adjacent the inner faces of the complementary tongues 15 and 16, prevent lateral shifting of the hinge section relatively to the fixed section. The hinge section is also preferably provided with a knob 23 by which it may be moved to open position for inserting the corn or other material into the kettle. The abutting edges of the sections are formed on opposite bevels so that the edge of the hinge section overlaps the edge of the fixed section to provide a relatively tight joint.

The rod 18 forms an important part of the present invention as it not only hinges the section 8, but is also constructed to cooperate with the ears 9 and 10 to anchor the fixed portion of the lid, as now described. The rod 18 extends beyond the tongue 16 and is provided with a downwardly offset portion 24 which moves in sliding contact with the upper face of the fixed section 7, and is of sufficient length to extend beyond the rim of the kettle and over the notch 14. Formed on the terminal of the offset extension is a depending hooked portion 25 operating in the notch 14 previously described to latch under the rim of the kettle, as best illustrated in Fig. 4. The terminal of the hook portion 25 is provided with an arcuately and laterally extending shoe portion 27 adapted to engage under the rim of the kettle and against the arcuate face of the wall 3 to prevent rotation of the rod in the hinge tongues when the hook portion is in clamping position. The arcuate shoe portion 27 is preferably of sufficient length so that the distance between the terminal thereof and the ear 9 is shorter than the diameter of the kettle to prevent lateral displacement of the lid in the direction of the ear 10.

It is thus apparent that the fixed portion of the lid is gripped to the rim of the kettle at three points about its periphery with the terminal of the arcuate portion 27 and the ear 9 lying on a chord extending substantially at right angles to a diameter of the lid extending through the ear 10 so that the lid is anchored against shifting in all directions relatively to the kettle.

In order to retain the latch portion of the hinge rod in gripping position relatively to the kettle, the opposite end of the rod extends through the tongue 15 to accommodate a coil spring 28 thereon having one end engaging against the tongue 15 and the opposite end against a stop member 29 threaded on the projecting end of the rod, as best illustrated in Fig. 1.

It is thus apparent that the tension of the spring retains the hook-shaped portion of the rod within the notch 14 and the arcuate-shaped portion in latching engagement with the rim of the kettle.

When it is desired to remove the lid, the rod may be shifted longitudinally by applying pressure of the thumb against the abutment member 29 to move the hook end of the rod including the arcuate-shaped latch portion thereof out of engagement with the kettle, so that the latch may be lifted over the rim 4 to free the ears 9 and 10 upon lateral shifting of the lid.

In order to provide the lid with a stirring mechanism, the fixed portion thereof is provided in the axis of the lid with an upwardly extending boss 30 having an axial opening 31 for rotatably mounting a vertical shaft 32. The actuating shaft is of sufficient length to extend from the bottom of the kettle upwardly through the boss a sufficient distance to accommodate a crank handle 33.

The handle 33 includes a hub portion 34 having an axial opening therethrough to accommodate the end of the actuating rod and is provided with a set screw 35 adapted to engage against a flattened face 36 on the projecting end of the rod to key to the crank thereto. The crank includes a radially extending arm 37 carrying a knob 38 by which the crank may be rotated to operate the shaft 32.

Extending through the lower end of the shaft 32 at a point spaced slightly above the bottom of the kettle is an agitating rod 39 for stirring and agitating the corn as it is being popped to prevent burning.

In order to prevent lifting of the agitating rod 39 from the bottom of the kettle, I provide the actuating shaft with a stop collar 40 engaging under the face of the lid, as illustrated in Fig. 2, the stop collar being retained in adjusted position by a set screw 41.

If desired, washers 42 and 43 may be provided between the upper end of the boss 30 and the crank, and between the collar and the lower face of the lid, as illustrated in Fig. 2.

To use the device in popping corn, the lid is placed over the top of the kettle and the pivot rod 18 is shifted to allow the arcuate-shaped portion of the latch to pass over the rim thereof to draw the ears 9 and 10 in position to cooperate therewith in preventing shifting of the lid when the pressure against the rod is released.

In order to prevent rotation of the lid, the lug 9 is preferably located in abutting relation with the side of the handle 5 in the direction of rotation of the agitating crank.

The agitating mechanism, being carried by the fixed portion of the lid, is then in position to stir the corn. The corn, grease and salt are poured into the kettle through the arcuate-shaped opening closed by the hinge section 8. When the hinge section 8 is closed, the kettle is sufficiently tight to prevent escape of grease vapor and heat during popping the corn. The corn may be agitated by rotating the handle in either direction to prevent burning thereof and to thoroughly mix the grease therewith.

After the corn is popped, the kettle may be lifted and turned bottom side up, which effects automatic opening of the hinge portion of the lid to allow emptying of the corn, the weight of the lid being sufficient to allow free opening thereof.

When the device is used in making sugared corn, the lid may be readily opened to apply the sugar at the proper time without danger of burning the operator.

From the foregoing it is apparent that I have provided a lid construction which is firmly anchored in position without altering or defacing the kettle, and that the cover fits sufficiently tight to prevent escape of grease and heat used in popping the corn.

When the corn popping attachment for the kettle is removed, the parts, being all secured together, cannot become lost or misplaced, and the kettle may be used for any purpose for which an ordinary kettle is used. Attention is directed to the sloping walls of the kettle which allow space for the popped corn, and the inclined walls support much of it above and out of contact with the flat bottom of the kettle.

What I claim and desire to secure by Letters Patent is:

1. In combination with a kettle having a rim, a lid including a fixed section and movable section, means slidably mounted relatively to said sections for hinging the movable section to the fixed section, means on the fixed section for engaging said rim, latching means connected with said hinging means and movable thereby upon sliding movement of the hinging means for cooperating with said hinging means to secure the lid to the kettle.

2. In combination with a kettle having a rim, a lid including a fixed section and a movable section, complementary hinge members on the respective sections, a rod slidably mounted in said hinge members to hinge the movable section to the fixed section, means on the fixed section for engaging said rim, and latching means on said rod and movable by the rod in one direction to clear the rim, and means connected with the rod to retract the rod and retain the latching means in engagement with the kettle to cooperate with said engaging means to secure the lid to the kettle.

3. In combination with a kettle having a rim, a lid including a fixed section and a movable section, complementary hinge members on the respective sections, a rod extending through said hinge members to hinge the movable section to the fixed section, a hook member formed on the end of said rod and arranged to engage said rim, lugs on the fixed section cooperating with said hook to anchor the lid on the kettle, and yielding means for retaining said hook in engagement with the rim of the kettle.

4. In combination with a kettle having a rim, a lid including a fixed section and a movable section, complementary hinge members on the respective sections, a rod extending through said hinge members to hinge the movable section to the fixed section, a hook member formed on the end of said rod and arranged to engage said rim, lugs on the fixed section cooperating with said hook to anchor the lid on the kettle, and yielding means for retaining said hook in engagement with the rim of the kettle.

5. In combination with a kettle having a rim, a lid including a fixed section and a movable section, complementary hinge members on the respective sections, a rod extending through said hinge members to hinge the movable section to the fixed section, lugs on the fixed section for engaging said rim, a hook member formed on the end of said rod arranged to engage the rim, and a spring on said rod for retaining the hook in engaging position to cooperate with the lugs in securing the lid to the kettle.

6. In combination with a kettle having a rim, a lid including a fixed section and a movable section, hinge members on the respective sections, a rod extending through said hinge members to hinge the movable section to the fixed section, lugs on the fixed section, a hook member formed on the end of the rod for engaging the rim, an arcuate-shaped terminal formed on the hook member to engage the wall of the kettle, and means for retaining said hook member and said arcuate-shaped terminal in engagement with the rim and wall of the kettle to cooperate with the lugs in securing the lid.

7. In combination with a kettle having a rim, a lid including a fixed section and a movable section having a bevelled edge overlapping a bevelled edge on the fixed section, complementary hinge members on the respective sections, a rod extending through said hinge members to hinge the movable section to the fixed section, a hook member formed on the end of said rod and arranged to engage said rim, lugs on the fixed section cooperating with said hook to retain the lid on the kettle, and yielding means for retaining said hook in engagement with said rim.

8. In combination with a kettle, a lid including a fixed section and a movable section, means for hinging the movable section to the fixed section including means for clamping the fixed section to the rim, and spring tension means engaging said hinging means for retaining the clamping means in clamping engagement with the kettle.

In testimony whereof I affix my signature.

RALPH P. HUMPHREY.